United States Patent [19]
Schneider

[11] Patent Number: 4,631,611
[45] Date of Patent: Dec. 23, 1986

[54] READ/WRITE HEAD POSITIONER ARRANGEMENT

[75] Inventor: Guenter Schneider, Concord, Mass.

[73] Assignee: Digital Equipment Corporation, Maynard, Mass.

[21] Appl. No.: 529,840

[22] Filed: Sep. 6, 1983

[51] Int. Cl.$^4$ .................... G11B 5/58; G11B 21/08
[52] U.S. Cl. .................................. 360/106; 360/78
[58] Field of Search .................... 360/97–99, 360/105, 106, 78, 104, 109, 75–76; 33/430, 434, 438, 448

[56] References Cited

U.S. PATENT DOCUMENTS

| | | | |
|---|---|---|---|
| 3,867,762 | 2/1975 | Koenuma | 33/438 |
| 4,221,056 | 9/1980 | Hirano | 33/434 |
| 4,310,863 | 1/1982 | Kohl et al. | 360/106 |
| 4,399,477 | 8/1983 | Bryer | 360/106 |
| 4,419,707 | 12/1983 | Woodier | 360/106 |

OTHER PUBLICATIONS

Wheeler, "Tensioning System to a Band Access Mechanism", Dec. 1974, IBM TDB, vol. 17, No. 7, pp. 2088–2089.

*Primary Examiner*—John H. Wolff
*Assistant Examiner*—David J. Severin
*Attorney, Agent, or Firm*—William E. Cleaver

[57] ABSTRACT

The present invention employs, in a preferred embodiment, a pair of pulleys, one of which is fixed and the other of which is movable and each of which has substantially the same diameter. The pulleys each have an axial aperture which holds a bearing arrangement including a shaft. Mounted across the two shafts is a pair of plates which are interconnected and therefore act together as a rigid body. The rigid body, or rigid member, is movable in a rotary fashion. In addition, there is a flexible band member which loops a substantial section of the movable pulley and, in a preferred embodiment, is disposed to come in frictional contact with the movable pulley and the fixed pulley. The ends of the band are secured to the fixed pulley and are held in tension. Accordingly, as the plates (the rigid body) are moved in a rotary fashion around the center of the fixed pulley, the movable pulley is moved, relative to its associated shaft, in a counter direction in response to the friction force between the band and the movable pulley. Hence, in the preferred embodiment, the movable pulley effects a curvilinear translation. A read/write head assembly is secured to the movable pulley and in response to the curvilinear translation, the read/write head assembly is moved radially across a plurality of tracks of a magnetic disk. In this way, the change in yaw, or skew, between the read/write head and the tracks on the magnetic disk is held to a minimum.

13 Claims, 6 Drawing Figures

READ/WRITE HEAD POSITIONER ARRANGEMENT

BACKGROUND

In the prior art (magnetic disk memory systems) read/write heads are guided across a plurality of tracks on a magnetic disk to effect either reading, or writing, of information from, or onto, that disk, by virtue of a linear track positioner system or by a rotary arm positioner system. Rotary arm positioner systems have many advantages over linear track positioner systems. In a rotary arm positioner system there are fewer problems or considerations, related to friction, because, for one reason, there are fewer bearings. In addition, there are less elements to wear in a rotary arm positioner system. The reflected inertia to the driving means in a rotary arm positioner system is less than in a linear system and hence the rotary arm positioner system can employ smaller motors. The smaller arms of the rotary arm positioner system permits the design of more compact disk drives. Rotary arm positioner systems have fewer parts in the spindle, casting, positioner disk and head thermal circuit which makes thermal expansion and thermal hysteresis more predictable and consistent.

However, while rotary arm positioner systems can be designed to be balanced about their axis of rotation, which makes them insensitive to shock and vibration in the plane of the disk, such a design increases the moment of inertia and affects the access time adversely. The biggest drawback of a rotary arm positioner is the skew, or yaw, angle at which the read/write head has to fly on different radii of the disk. Yaw angles of up to $+/-15°$ have been implemented. However, this has not been considered satisfactory for the most part. The present invention basically combines all of the advantages of the linear track positioner system and all of the advantages of the rotary arm positioner system with virtually none of their disadvantages.

SUMMARY

The present system comprises (in a preferred embodiment) a fixed pulley and a movable pulley each of which is formed to have an axial aperture into which there is fitted a ball bearing assembly. A ball bearing assembly comprises two anti-friction bearings preloaded against each other and which surround a center shaft. Accordingly, there are two center shafts, one each associated with respectively the fixed pulley and the movable pulley. Mounted on the shafts are an upper plate and a lower plate which are interconnected and which act together as a rigid body. The upper and the lower plate are further secured one to the other through a center rib to add rigidity to the assembly. In addition, there is a flexible band which is mounted to come in contact with a substantial section of both the movable pulley and the fixed pulley, and which flexible band is secured in tension to the fixed pulley. As the plates are moved, relative to the center of the fixed pulley, in a rotary fashion, the movable pulley is moved in a counter direction around the shaft of the ball bearing assembly that it holds so that there is a curvilinear translation effected (relative to a fixed coordinate system). Mounted on the movable pulley is a read/write head assembly which moves, in response to the curvilinear translation, in a radial fashion across the plurality of tracks on a magnetic disk and thereby holds a relatively constant yaw, or skew, relationship between the gap in the read/write head and the tangent of the circular tracks of the magnetic disk.

The objects and features of the present invention will be better understood in view of the following description taken in conjunction with the drawings wherein.

Figure 1:
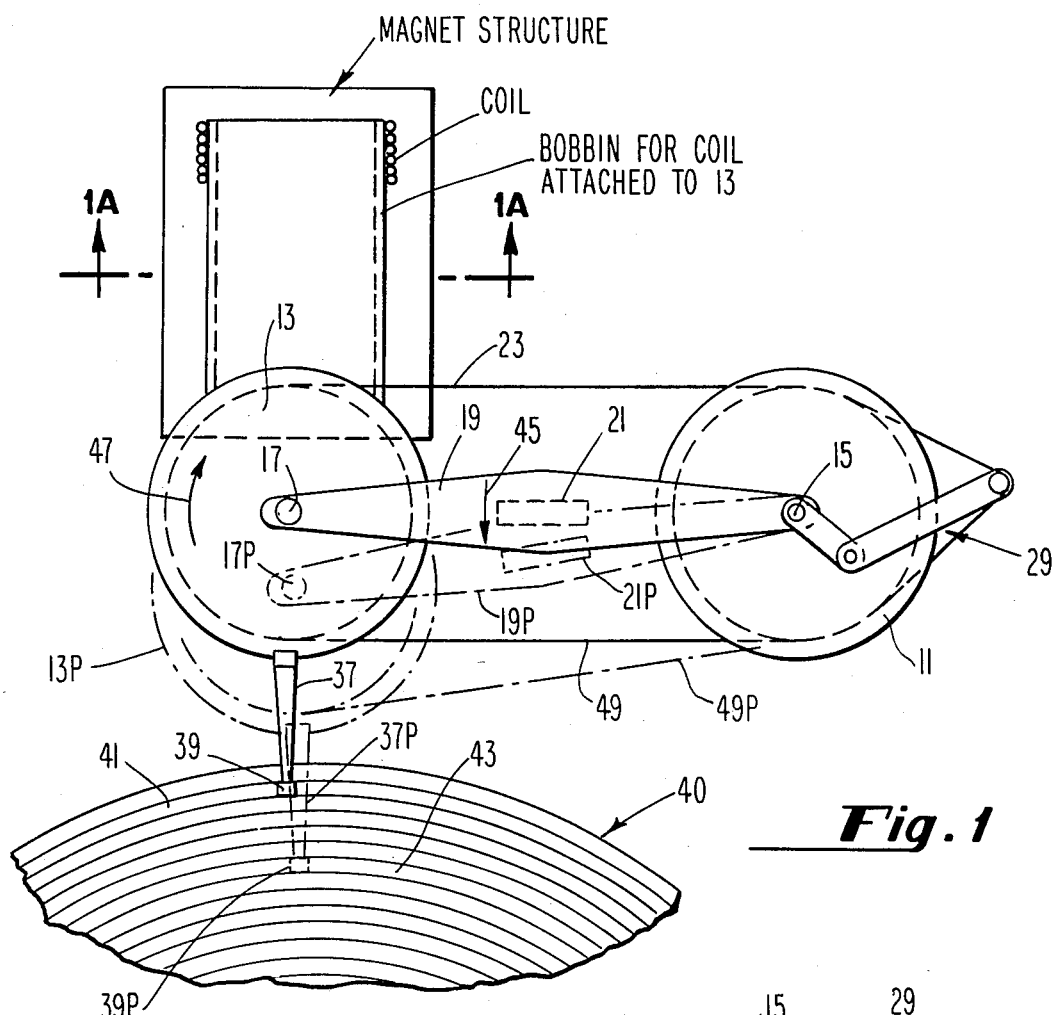
FIG. 1 depicts a top view schematic of the present invention showing the movable pulley in two different positions.

Consider FIG. 1. In FIG. 1 there is shown a fixed pulley 11 and a movable pulley 13. The fixed pulley 11 and the movable pulley 13 each are formed with an aperture in the center thereof which aperture holds, in a preferred embodiment, a pair of anti-friction bearing assemblies as well as a shaft. It should be understood that, in the preferred embodiment, pulleys are used, but other types of end pieces could be employed, such as a half pulley, or star configured member. Further, in the preferred embodiment, the diameter of each of the pulleys is substantially equal to the diameter of the other pulley to effect a curvilinear translation, but the diameters could be selectively different to cause the position of the read head gap, with respect to the tangent of the inside track, to be slightly altered from the position of the read head gap with respect to the tangent of the outside track. This slight change compensates for the slight change, in a curvilinear system, between the inside and outside tracks, with respect to the read head gap. It should also be understood that while, in the preferred embodiment, anti-friction bearings are used, in a low cost system other forms of bearings could be used.

The bearing arrangement can be better seen in FIG. 2 and will be discussed in more detail hereinafter. In FIG. 1, the shaft 15 and the shaft 17 are shown. Coupled between the shaft 15 and the shaft 17 is an upper plate 19. As will be discussed in connection with FIG. 2, there is an identical lower plate sitting under the plate 19 and these two plates are connected by a center rib 21 which is shown in dashed line form in FIG. 1. The center piece, or center rib 21, provides more rigidity to the two plates whose purpose is to act as a rigid means. The plate 19 is secured to the shafts 15 and 17 so that when the plate 19 is moved in a rotary fashion about shaft 15, the shaft 15 turns. The rigid body, including basically the two plates, can be considered to include the shafts 15 and 17 and the bearing assemblies discussed hereinafter.

Figure 4:
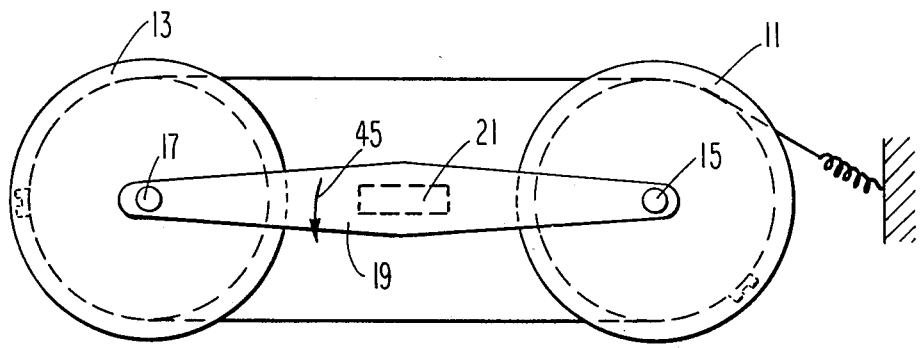
FIG. 4 depicts the present device with one free end spring loaded.
Figure 5:
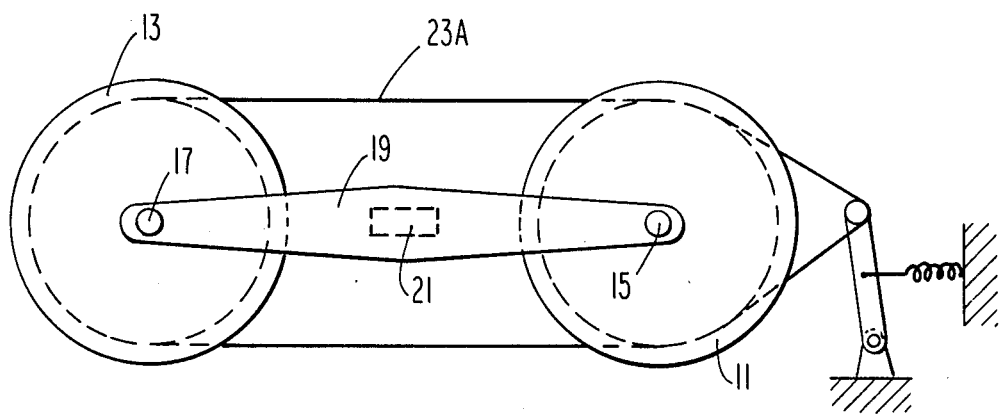
FIG. 5 depicts the present device with a spring loaded endless band.

Located around the pulleys 11 and 13 is a flexible band 23. In the preferred embodiment the band 23 is an aluminum endless band. Bands made of other material could be used, depending on thermal expansion considerations for other parts of the system. The metal band 23 is wrapped partially around the fixed pulley. The other part of the band 23 is also partially wrapped around the fixed pulley and tensioned by a link arrangement 29 as shown in FIG. 1. Actually, the arrangement shown in FIG. 1 is for philosophical purposes, that is to say that, the band 23 could be spring loaded in any number of ways (FIG. 4 being an example of spring loading). It should be understood that in another embodiment, the band 23 could take the configuration of the band 23A of FIG. 5 rather than being spring loaded. The band 23 (or 23A) forms an endless band. In order to place the endless band over the two pulleys, the band must be relatively large and, hence, there is slack in the band once it is fitted on the pulleys. In order to create tension for the band, it is passed over an eccentric arrangement and the eccentric arrangement is adjusted to create tension.

Connected to the movable pulley 13 is a read/write head holder member 37 on the end of which there is located a read/write head 39. An inspection of FIG. 1 shows that the read/write head 39 has been moved over the second track 41 of a magnetizable disk 40. Further inspection of FIG. 1 indicates that the magnetizable disk 40 has a plurality of tracks and that the read/write head 39 is located orthogonally with respect to the track 41 so that the gap of the read/write head 39 is in the most advantageous position to either read information from track 41 or to write information onto track 41. As was mentioned earlier, in connection with the discussion of rotary arm devices, in the prior art, if the read head were attached to the arm 19 and the arm 19 were to be moved from the position shown in solid lines to a second position shown in dash lines, then the head would be held in such a position with respect to the track 43 such that the gap would not be in the most advantageous position for either reading or writing. In other words, the skew effect, or the yaw, of the head with respect to the track 43 would render the gap in a more difficult position with respect to the flux on the track 43 so that a good reading may not be possible.

In the present device, as the arm 19 is rotated relative to the fixed pulley, in the direction depicted by the arrow 45, the frictional forces of the band 23 on the movable pulley 13 cause that pulley to rotate relative to the shaft 17 in a clockwise direction as depicted by the arrow 47 and this effects a curvilinear translation (relative to a fixed coordinate system). In other words, all of the points on the movable pulley 13 move on congruent curves. In a curvilinear translation, there is no rotation of any line in the body. Hence, a line running from the center of the shaft 17 through the read/write holder 37 is parallel to a line running through the shaft 17P and the read/write holder 37P.

As can be gleaned from FIG. 1, the movable pulley 13P is depicted to show where the pulley 13 would be if the plate 19 were moved to the position of where plate 19P is shown, so that the read head 39 could be moved to read the information on track 43. Under such circumstances the plate 19 is rotated in accordance with the arrow 45 and the movable pulley 13 is rotated relative to shaft 17 (as depicted by the arrow 47). As can be seen in FIG. 1, when the movable pulley 13 has been moved to the position 13P, the read/write holder 37 adopts a radial movement toward the center of the disk 40 and hence the read/write head 39 is still held substantially orthogonally with respect to the track with which it is intended to be utilized, in this case track 43. When the command is given to move the read/write head 39 to some intervening track, the movable pulley 13 will be moved upward in the drawing and will effect a counter clockwise rotation relative to shaft 17, while the arm 19 will effect a clockwise rotation.

Figure 2:
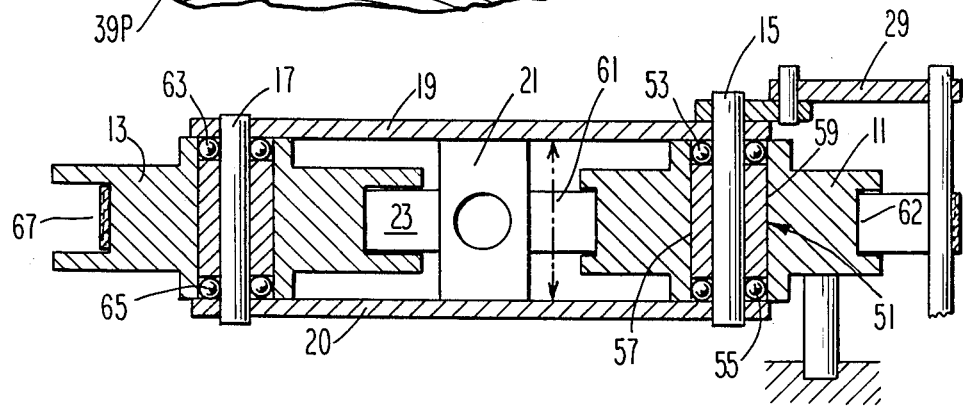
FIG. 2 is a cross section showing the two pulleys, the beam assembly and the rigid plate assembly.

In FIG. 2 there is shown a cross-section (not to scale) of the fixed pulley 11, the movable pulley 13, the upper arm 19 and the two shafts 15 and 17, along with the connecting rib 21. In addition in FIG. 2, there is shown a lower plate 20 which was mentioned above. In FIG. 2 there is shown in the aperture 51 of the fixed pulley 11, a pair of anti-friction bearing assemblies 53 and 55. The anti-friction bearing assemblies contain bearings which provide a tangential contact with the shaft 15, as well as a tangential contact with the walls 57 and 59 of the aperture 51. The plates 19 and 20 are designed to be held by the rib 21 so that the opening 61 therebetween is shorter than the axial distance, that is the distance along the shaft 15 between the outer edge of the bearing assembly 53 and the outer edge of the bearing assembly 55. Accordingly when the device is assembled, the plates 19 and 20 bring pressure against the bearing assemblies 55 and 53 to effect an axial preload of those bearings. In addition, the tension of the band at position 62, as shown in FIG. 2, against the fixed pulley 11 provides a radial load for the bearings 53 and 55. Such axial preloading and radial loading provides for a stiff and backlash free pivot. On the other side of the assembly the plates 19 and 20 axially preload the bearings 63 and 65 and the tension of the belt at position 67 provides the radial loading. While the preloading is effected, as described above, it should be understood that other forms of conventional preloading could be used.

Figure 3:
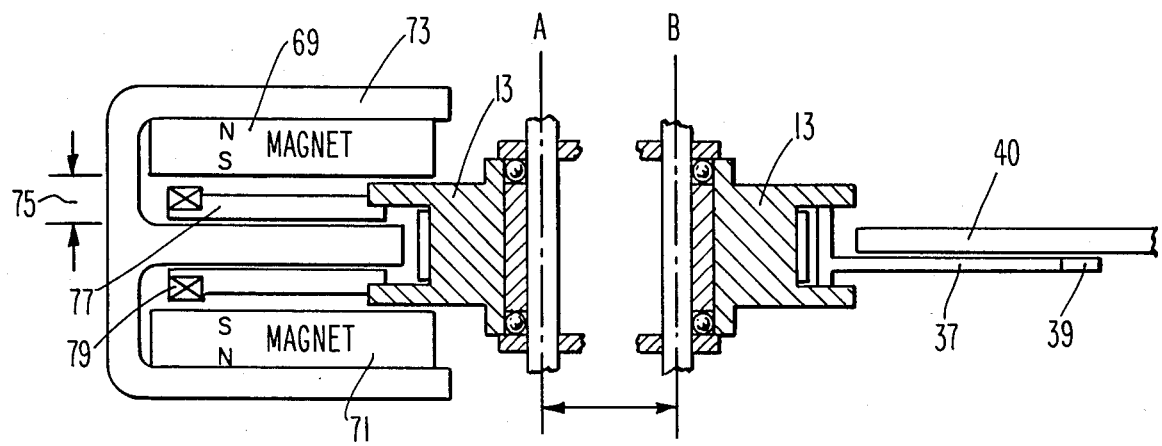
FIG. 3 shows the movable pulley with a driving means attached thereto.

If we consider FIG. 3, we see one form of moving the movable pulley 13, in a radial fashion, to be moved across a plurality of tracks for the purpose of reading or writing on any one of those tracks. In FIG. 3 there is shown a pair of magnets 69 and 71. The magnets 69 and 71 are polarized as shown by the north-south configuration. Also shown in FIG. 3 is a low reluctance path in the form of an "E". The flux passes from the north side of the magnet 69 through the low reluctance path 73 and returns across the gap 75. Attached to the movable pulley 13 is a bobbin 77 which holds a coil 79. The bobbin 77 and the coil 79 are located to move within the gap 75. When the coil 79 is energized in one direction, it provides flux which is additive to the flux from the permanent magnet on either the right or the left side of the coil, depending upon the direction of the electrical current. The foregoing provides a motor effect and it is well understood. In accordance with the motor effect, the bobbin 77 will be advanced to the right or advanced to the left, depending upon the direction of the current that is flowing in the coil 79 and depending upon how long that current is applied. If we consider that the bobbin 77 is advanced to the right, then the movable pulley 13 goes from the position A to the position B and the read/write head 39 has been moved over a plurality of tracks. When the read/write head 39 is to be moved to the left, to be located at some track along the disk 40, then the current in the coil will be reversed and the movable pulley 13 will be moved to the left. While in FIG. 3 the movable force is a well understood motor type device, commonly used in the disk drive techniques with magnetizable disks, it should be understood that other forms of force could be used to move the movable pulley or to move the plates 19 and 20, or rotate the shaft 15.

The present invention, as described herein above, provides the advantages in that it is a low friction device with very few parts to wear and it does permit the system to advance the read/write head onto any one of a number of tracks on a magnetizable disk, with very little change to the yaw, or the skew, of the reading head with respect to the tracks. For instance, in a disk drive with the same envelope dimensions, a rotary arm positioner would skew the head plus or minus 15° whereas the present arm positioner, in accordance with the present invention, covering the same area on the disk, skews the read/write head plus or minus 0.75°. A skew of point 0.75° is approximately the same magnitude as the tolerance with which a head gets aligned to the head arm during manufacture.

I claim:

1. An arrangement to move a read/write head across a plurality of tracks on a magnetizable disk comprising in combination: a fixed member formed to hold first bearing means; a movable member formed to hold second bearing means; rigid means formed to include first and second bearing means, said first bearing means formed and disposed to be rotationally coupled to said fixed member and said second bearing means formed and coupled to said movable member to enable said movable member to rotate about said second bearing means, whereby said rigid means can effect a rotary movement relative to said fixed member and said movable member can effect a rotary movement relative to said second bearing means; flexible means formed and disposed to come in contact with a substantial section of said movable member, said substantial section lying away from said fixed member and said flexible means formed and disposed to be secured in tension to said fixed member; and read/write head assembly means secured to said movable member, whereby in response to said rotary movement of said rigid means said movable member is moved thereby moving said read/write head substantially radially across a magnetic disk.

2. An arrangement according to claim 1 wherein said fixed member is a fixed pulley.

3. An arrangement according to claim 1 wherein said movable member is a movable pulley.

4. An arrangement according to claim 1 wherein said flexible means in an aluminum band which is secured to said fixed pulley at one end and is spring loaded at its other end.

5. An arrangement according to claim 1 wherein said flexible means is an endless belt and wherein said flexible means is held in tension by an eccentric member coming in contact therewith.

6. An arrangement according to claim 1 wherein said flexible means is held in non-slipping contact with said movable pulley whereby when said rigid means is rotated clockwise said flexible means through said non-slipping contact moves said movable pulley relative to its associated shaft in a counter clockwise direction.

7. An arrangement according to claim 1 wherein there is further included a means of generating a force which means is secured to said movable pulley.

8. An arrangement according to claim 7 wherein said means to generate a force is a motor means.

9. An arrangement according to claim 1 wherein said fixed member is a fixed pulley and said movable member is a movable pulley.

10. An arrangement according to claim 9 wherein said fixed pulley and said movable pulley have substantially the same diameters and whereby in response to said rotary movement of said rigid member, said movable member is moved to effect a curvilinear translation.

11. An arrangement according to claim 9 wherein said rigid means includes an upper plate and a lower plate, said plates being disposed so that said fixed pulley and said movable pulley are each held axially between said upper plate and said lower plate.

12. An arrangement according to claim 11 wherein each of said plates is formed to have an aperture at each end thereof and wherein said first bearing means includes a shaft to pass through an associated aperture in each of said upper and lower plates and said second bearing means includes a shaft to pass through different associated apertures in each of said upper and lower plates.

13. An arrangement according to claim 11 wherein said upper plate and said lower plate are secured one to the other by a support means disposed therebetween.

* * * * *